(12) United States Patent
Ramsey

(10) Patent No.: US 10,316,989 B2
(45) Date of Patent: *Jun. 11, 2019

(54) MULTI-PIPE SUSPENSION SYSTEM

(71) Applicant: Steven Bryan Ramsey, Indianapolis, IN (US)

(72) Inventor: Steven Bryan Ramsey, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,250

(22) Filed: Aug. 21, 2018

(65) Prior Publication Data

US 2019/0072214 A1   Mar. 7, 2019

Related U.S. Application Data

(63) Continuation of application No. 15/696,250, filed on Sep. 6, 2017, now Pat. No. 10,082,225.

(51) Int. Cl.
| | | |
|---|---|---|
| *F16L 3/22* | (2006.01) | |
| *F16L 3/12* | (2006.01) | |
| *F16L 3/14* | (2006.01) | |
| *F16L 3/133* | (2006.01) | |
| *F16L 3/08* | (2006.01) | |
| *F16L 3/127* | (2006.01) | |
| *F16L 3/137* | (2006.01) | |
| *F16L 3/23* | (2006.01) | |

(Continued)

(52) U.S. Cl.
CPC ............... *F16L 3/14* (2013.01); *F16L 3/1058* (2013.01); *F16L 3/127* (2013.01); *F16L 3/133* (2013.01); *F16L 3/137* (2013.01); *F16L 3/22* (2013.01); *F16L 3/221* (2013.01); *F16L 3/227* (2013.01); *F16L 59/135* (2013.01); *H02G 3/263* (2013.01); *F16L 3/23* (2013.01); *F16L 3/24* (2013.01)

(58) Field of Classification Search
CPC ... F16L 3/14; F16L 3/127; F16L 3/137; F16L 3/22; F16L 3/24; F16L 3/133; F16L 3/227; F16L 3/23
USPC ......... 248/49, 65, 68.1, 71, 74.1, 74.2, 74.3, 248/317; 24/16 R, 13 R, 271
See application file for complete search history.

(56) References Cited

U.S. PATENT DOCUMENTS 3,347,505 A * 10/1967 Menser ................ F16L 3/1008
                                                   248/218.4
3,944,175 A *  3/1976 Kearney ................ E21F 17/02
                                                       248/59

(Continued)

*Primary Examiner* — Tan Le
(74) *Attorney, Agent, or Firm* — Maginot, Moore & Beck, LLP

(57) ABSTRACT

A multi-pipe suspension system comprises a multi-pipe trapeze hanger having a first member, a second member arranged perpendicular to the first member, the second member having a first pair of openings and a second pair of openings, a first cradle and a second cradle arranged along the first member, a first ledge projecting perpendicularly from the first cradle configured to support a first pipe, a second ledge projecting perpendicularly from the second cradle configured to support a second pipe, a third ledge located between the first and second ledges and including a third opening, the second member including a mounting rod guide, a mounting rod arranged to pass through the third opening and mounting rod guide, a system clamp attached to an upper end of the mounting rod and a pipe strap constructed to support a third pipe attached to a lower end of the mounting rod.

16 Claims, 3 Drawing Sheets

(51) Int. Cl.
*F16L 3/24* (2006.01)
*F16L 3/227* (2006.01)
*F16L 59/135* (2006.01)
*F16L 3/10* (2006.01)
*H02G 3/00* (2006.01)

(56) References Cited

U.S. PATENT DOCUMENTS

| | | | | |
|---|---|---|---|---|
| 4,907,766 | A * | 3/1990 | Rinderer | F16L 3/22 |
| | | | | 248/57 |
| 5,267,710 | A * | 12/1993 | Condon | F16L 3/24 |
| | | | | 248/56 |
| 5,876,000 | A * | 3/1999 | Ismert | E03C 1/021 |
| | | | | 248/65 |
| 6,402,096 | B1 * | 6/2002 | Ismert | F16L 3/221 |
| | | | | 24/271 |
| 8,141,826 | B1 * | 3/2012 | Gallardo | F16L 3/1091 |
| | | | | 24/16 R |

* cited by examiner

MULTI-PIPE SUSPENSION SYSTEM

CROSS-REFERENCE TO RELATED APPLICATIONS

This application is a Continuation Application of U.S. application Ser. No. 15/696,250 entitled "Improved Multi-Pipe Suspension System" by Steven Ramsey, filed Sep. 9, 2017, which is hereby incorporated in its entirety, as if fully set forth herein.

BACKGROUND

The present disclosure relates to devices for supporting pipes. More particularly, the present disclosure relates to devices for supporting and suspending multiple pipes, including different types of pipes for either commercial or residential applications.

SUMMARY OF THE INVENTION

The multi-pipe trapeze hanger of the present disclosure includes a first member having a first end and an opposing second end and a second member arranged substantially perpendicular to the first member, the second member having at least one first opening located toward the first end and at least one second opening located toward the second end. The multi-pipe trapeze hanger of the present disclosure further includes a first cradle arranged along the first member, the first cradle located toward the first end and a first ledge projecting perpendicularly from the first cradle. The first member includes a second cradle located toward the second end and a second ledge projecting perpendicularly from the second cradle. Further included is a securing device for securing a first pipe on the first ledge wherein the securing device is constructed to wrap around the first pipe and project through the at least one first opening.

An improved multi-pipe suspension system comprising, a multi-pipe trapeze hanger having a first member, the first member having a first end and an opposing second end, a second member arranged substantially perpendicular to the first member, the second member having at least one first opening located toward the first end and at least one second opening located toward the second end, a first cradle arranged along the first member, the first cradle located toward the first end, a first ledge projecting perpendicularly from the first cradle and extending over the second member, the first cradle and first ledge configured to support a first pipe, a second cradle arranged along the first member, the second cradle located toward the second end, a second ledge projecting perpendicularly from the second cradle and extending over the second member, the second ledge and second cradle configured to support a second pipe, a third ledge extending perpendicularly from the first member, the third ledge arranged along the first member between the first ledge and second ledge, the third ledge defining a first through hole, the second member including a second through hole located directly below the first through hole.

The improved multi-pipe suspension system further comprising a mounting rod having an upper end and a lower end, the mounting rod constructed to pass through the first and second through holes, a system clamp attached to the upper end, a first level lock constructed to be adjustably arranged on the mounting rod above the third ledge, a second level lock constructed to be adjustably arranged on the mounting rod below the second member, a pipe strap adjustably attached to the lower end, the pipe strap constructed to support a third pipe and a securing device constructed to wrap over the first pipe and project through the at least one first opening to secure the first pipe to the first ledge.

A method for using an improved multi-pipe suspension system comprising the steps of securing a first multi-pipe suspension system to a structure, the multi-pipe suspension system comprising a multi-pipe trapeze hanger having a first member, the first member having a first end and an opposing second end, a second member arranged substantially perpendicular to the first member, the second member having at least one first opening located toward the first end and at least one second opening located toward the second end, a first cradle arranged along the first member, the first cradle located toward the first end, a first ledge projecting perpendicularly from the first cradle and extending over the second member, the first cradle and first ledge configured to support a first pipe, a second cradle arranged along the first member, the second cradle located toward the second end, a second ledge projecting perpendicularly from the second cradle and extending over the second member, the second ledge and second cradle configured to support a second pipe, a third ledge extending perpendicularly from the first member, the third ledge arranged along the first member between the first ledge and second ledge, the third ledge defining a first through hole, the second member including a second through hole located directly below the first through hole.

The method for using an improved multi-pipe suspension system wherein the multi-pipe suspension system further comprising a mounting rod having an upper end and a lower end, the mounting rod arranged to pass through the first and second through holes, a system clamp attached to the upper end, a first level lock constructed to be adjustably arranged on the mounting rod above the third ledge, a second level lock constructed to be adjustably arranged on the mounting rod below the second member and a pipe strap adjustably attached to the lower end, the pipe strap constructed to support a third pipe.

The method for using an improved multi-pipe suspension system further comprising the steps of securing the first pipe on the first ledge using a first securing device that is wrapped over the first pipe and projects through the at least one first opening, securing the second pipe on the second ledge using a second securing device that is wrapped over the second pipe and projects through the at least one second opening, and supporting the third pipe with the pipe strap.

DETAILED DESCRIPTION

Figure 1:
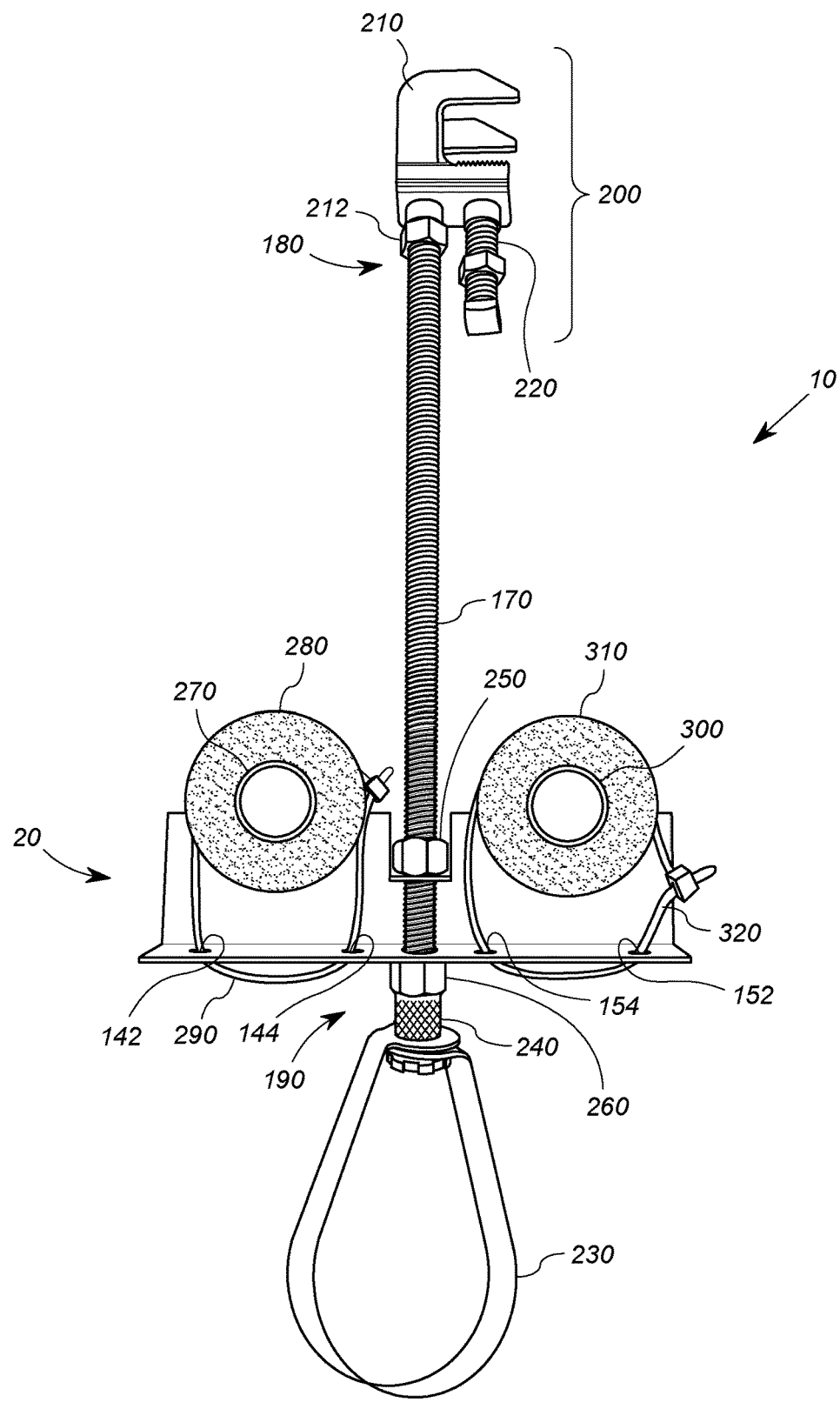
FIG. 1 is a non-limiting schematic of a multi-pipe suspension system according to one aspect of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
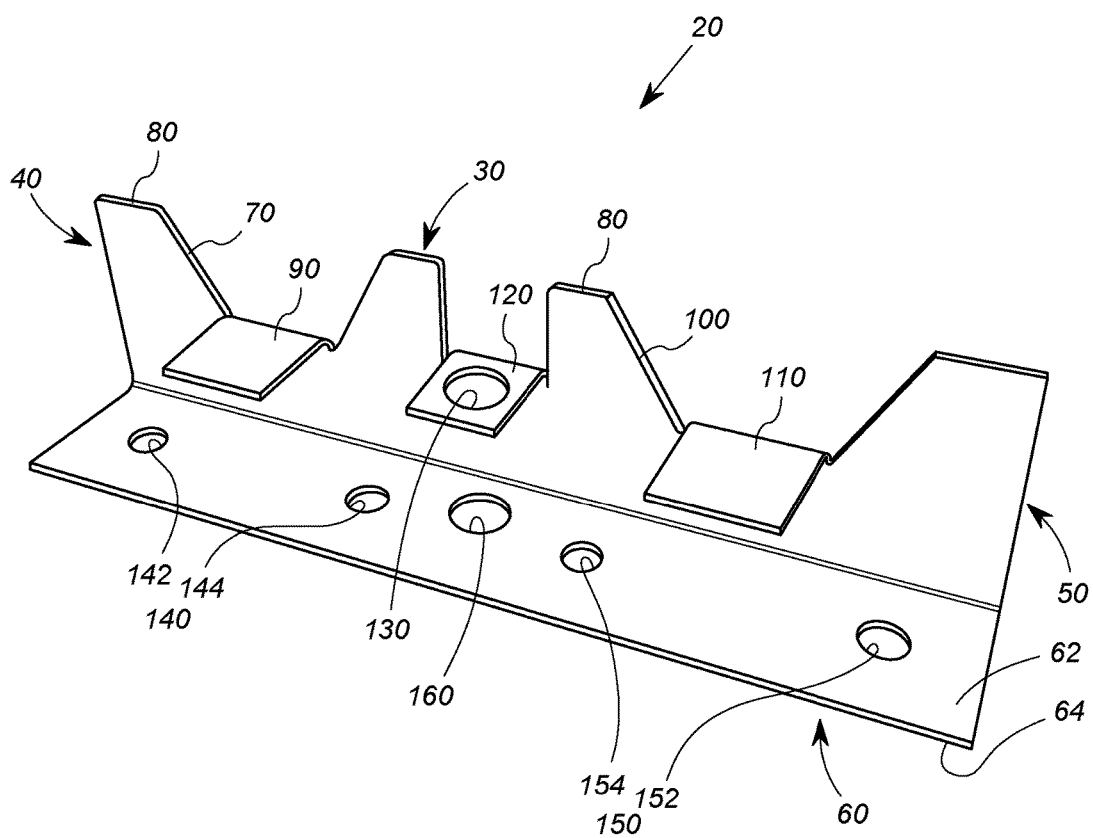
FIG. 2 is a non-limiting enlarged perspective view of a multi-pipe trapeze hanger according to one aspect of the present disclosure.

A schematic view of a multi-pipe suspension system 10 is shown in FIG. 1 and a perspective view of an embodiment of the multi-pipe trapeze hanger 20 is shown in FIG. 2. Referring to both FIGS. 1 and 2, multi-pipe trapeze hanger 20 includes a first member 30 and a second member 60. The first member 30 has a first end 40 and a second end 50. Second member 60 is arranged substantially perpendicular to first member 30. When viewed from first end 40, first member 30 and second member 60 are "L" shaped. However, in one embodiment (not shown) one of ordinary skill would understand that the second member 60 could project in the opposite direction from first member 30 such that, when viewed from second end 50, first member 30 and second member 60 are "L" shaped.

Figure 3:
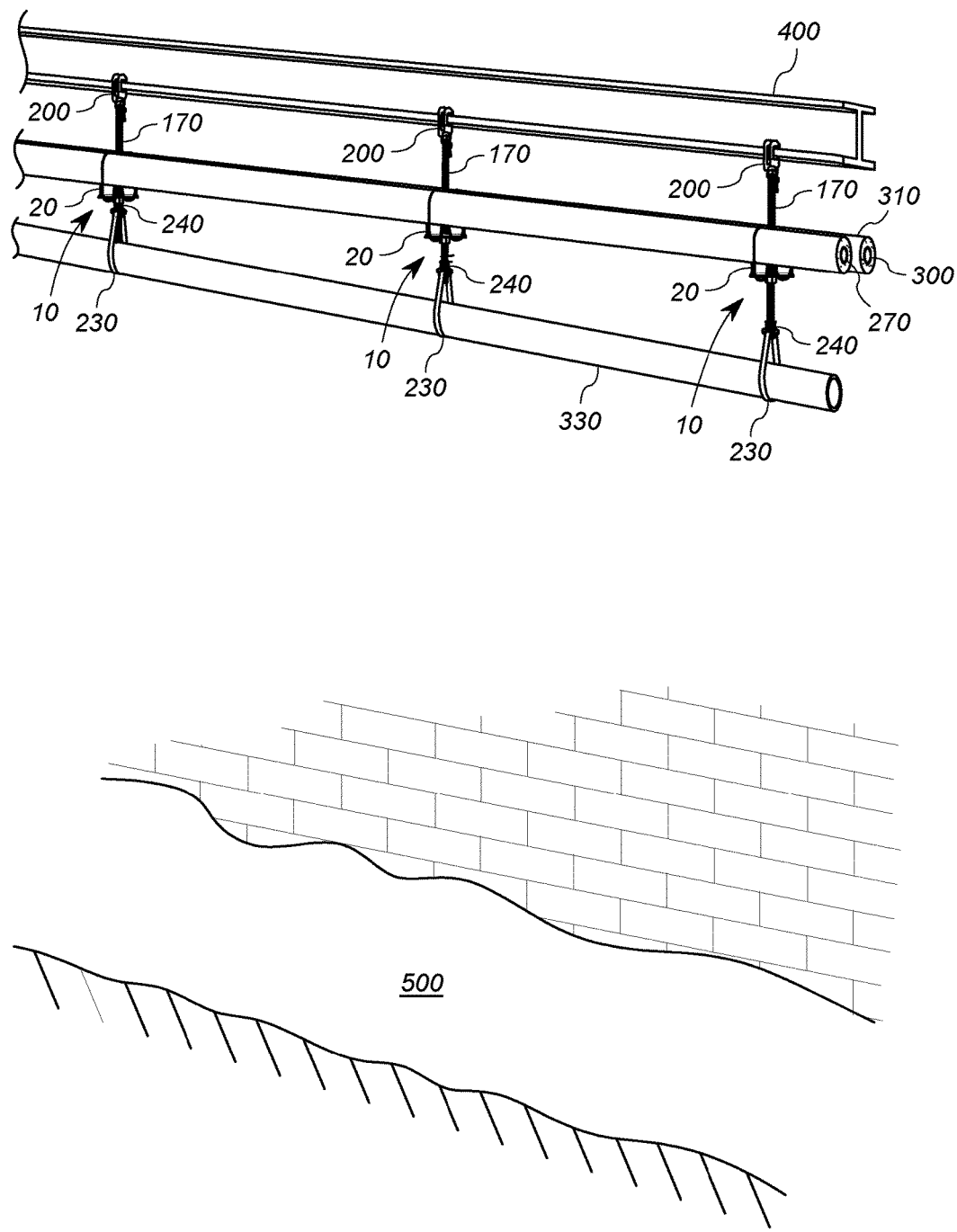
FIG. 3 is a non-limiting perspective view of a series of multi-pipe suspension systems of FIG. 1 according to one aspect of the present disclosure.

First member 30 further includes a first cradle 70 arranged along a top edge 80 of first member 30. The first cradle 70 is located toward the first end 40 of first member 30. A first ledge 90 projects perpendicularly from the bottom of first cradle 70. In one embodiment, the first ledge 90 projects over second member 60. The first ledge 90 may be arranged substantially parallel to second member 60. However, in another embodiment (not shown), first ledge 90 may project in a direction opposite of second member 60 such that the first ledge 90 does not extend over second member 60. In either case, first cradle 70 and first ledge 90 are constructed to support a pipe as shown in FIG. 1 and FIG. 3.

First member 30 also includes a second cradle 100 arranged along top edge 80 of first member 30. The second cradle 100 is located toward the second end 50 of first member 30. A second ledge 110 projects perpendicularly from the bottom of second cradle 100. In one embodiment, the second ledge 110 projects over second member 60. The second ledge 110 may be arranged substantially parallel to second member 60. However, in another embodiment (not shown), second ledge 110 may project in a direction opposite of second member 60 such that the second ledge 110 does not extend over second member 60. In either case, second cradle 100 and second ledge 110 are constructed to support a second pipe as shown in FIG. 1 and FIG. 3. Note, the first ledge 90 and second ledge 110 do not necessarily have to project in the same direction from first member 30.

As shown most clearly in FIG. 2, third ledge 120 may extend perpendicularly from first member 30. Third ledge 120 may extend over second member 60. Third ledge 120 is located between first ledge 90 and second ledge 110. Third ledge 120 defines an opening 130 suitable for receiving a mounting rod 170. Opening 130 may be any suitable shape for receiving mounting rod 170.

As stated previously, second member 60 is arranged substantially perpendicular to first member 30. Second member 60 has a first end and second end that correspond, respectively, to first end 40 and second end 50 of first member 30. Second member 60 also has a top surface 62 and an opposing bottom surface 64. Second member 60 includes a first at least one opening 140 positioned toward the first end. In the embodiment shown in FIG. 2, the first at least one opening includes two openings 142, 144. However, one of ordinary skill will recognize that other configurations are encompassed by this disclosure. For example, the at least one first opening 140 could be a single opening located toward the first end of second member 60 and disposed beneath first ledge 90.

Second member 60 further includes an at least one second opening 150 located toward the second end of second member 60. In the embodiment shown in FIG. 2, the second at least one opening includes two openings 152, 154. However, one of ordinary skill will recognize that other configurations are encompassed by this disclosure. For example, the at least one second opening 150 could be a single opening located toward the second end of second member 60 and disposed beneath second ledge 110. Second member 60 further includes a mounting rod guide 160 located directly below and in line with opening 130 of third ledge 120.

Referring primarily to FIG. 1, multi-pipe suspension system 10 further includes mounting rod 170, which has an upper end 180 and a lower end 190. Mounting rod 170 may be threaded over its entire length or may be threaded over selected portions of its length. A system mount 200 is attached near the upper end 180. The system mount 200 may be removably attached to upper end 180, adjustably attached to upper end 180 or fixedly attached to upper end 180.

In the embodiment shown in FIG. 1, the system mount 200 comprises a c-clamp 210 and c-clamp bolt 220 arrangement. The c-clamp 210 has an interface that includes internal threads that are complementary to the threads of the mounting rod 170. Thus, the c-clamp 210 is attached to the mounting rod 170 by screwing it on the upper end 180. This particular mating arrangement allows the mounting rod 170 to be rotatable over a full 360 degree range relative to a centerline running along the length of the mounting rod. A locking nut 212 fixes the position of the c-clamp 210 relative to the mounting rod 170 when the locking nut 212 is adjusted against a bottom portion of the c-clamp 210.

To mount the multi-pipe suspension system on a structure, the c-clamp 210 is arranged on, for example, the lip of an I-beam and the c-clamp bolt 220 is tightened against the I-beam lip. In this manner, the multi-pipe suspension system 10 is suspended below the I-beam. Note, system clamp 200 is not restricted to only a c-clamp arrangement, as one of ordinary skill would understand that system mount may be tailored to a specific application that requires a different mounting system than the c-clamp arrangement depicted in FIG. 1. For example, and without limiting the options available to one of ordinary skill in the art, system mounting options may include wall plates and Sammys® Screws.

The multi-pipe suspension system 10 further includes a pipe strap 230 attached to coupler 240. Coupler 240 is constructed to adjustably mount on the lower end 190 of mounting rod 170, thereby, suspending the pipe strap near the lower end 190 of mounting rod 170. Coupler 240 includes a hollow bore having internal threads along at least a portion of its length that are complementary to the mounting rod threads. Thus, in this embodiment of the present disclosure, the coupler 240 and attached pipe strap 230 are attached to the lower end 190 of the mounting rod by screwing the coupler 240 onto mounting rod 170. Moreover, it is apparent that the relative position of the pipe strap 230 on mounting rod 170 can be adjusted by screwing the coupler 240 further upward on the mounting rod 170.

The multi-pipe trapeze hanger 20 is adjustably mounted on mounting rod 170, by sliding mounting rod 170 through the appropriate features of the multi-pipe trapeze hanger 20. Specifically, the mounting rod 170 is guided through opening 130 of third ledge 120 and mounting rod guide 160 located directly below and in line with opening 130 of third ledge 120. This results in the lower end 190 of mounting rod 170 extending below the multi-pipe trapeze hanger 20 and the upper end 180 extending above the multi-pipe trapeze hanger 20.

The position of the multi-pipe trapeze hanger 20 may be adjustably mounted on the mounting rod 170 to allow adjustment of the level of one or more pipes supported on the multi-pipe trapeze hanger 20. In the embodiment shown in FIG. 1, a first level adjuster 250 is adjustably arranged on mounting rod 170 such that the first level adjuster 250 is located on the mounting rod 170 above the third ledge 120. First level adjuster 250 may be a nut configured with a thread pattern complimentary to the thread pattern of mounting rod 170. First level adjuster 250 may include any other design suitable for being adjustably mounted on the mounting rod and is not limited to the nut configuration shown in FIG. 1.

Second level adjuster 260 is arranged on mounting rod 170 below second member 60. Second level adjuster 260 may be a nut configured with a thread pattern complimentary to the thread pattern of mounting rod 170. Second level adjuster 260 may include any other design suitable for being adjustably mounted on the mounting rod and is not limited to the nut configuration shown in FIG. 1. First level adjuster 250 and second level adjuster 260 are used to locate and lock into place second member 60 at any desired point along mounting rod 170 between the system mount 200 and coupler 240.

The multi-pipe suspension system 10 is used to support as many as three pipes. Referring to FIG. 3, a series of multi-pipe suspensions 10 are attached via system mount 200 to an I-beam 400. In use, a first pipe 270 is arranged in and on first cradle 70 and first ledge 90 of each multi-pipe trapeze hanger 20 mounted on their respective mounting rods 170. First pipe 270 may be wrapped with, for example, insulation 280, but, it should be understood, that first pipe 270 may be arranged in and on first cradle 70 and first ledge 90 with or without insulation.

First pipe 270 may be secured in place on first cradle 70 and first ledge 90 with a securing device 290. Securing device 290 is wrapped over first pipe 270 and projected through the first at least one opening 142, 144 such that a portion of the securing device spans the bottom surface 64 of second member 60 thereby securing the first pipe 270 on second member 60. The securing device 290 may be any configuration that is flexible enough to wrap around first pipe 270. Non-limiting examples of suitable securing devices include but are not limited to zip-ties, wire ties, wire and the like.

Note, if first pipe 270 includes an insulating wrap 280, then securing device 290 will wrap over insulation 280 and through the first at least one opening 142, 144 in the same manner as discussed above. First pipe 270 may be any type of pipe suitable for being supported. Types of pipes include by are not limited to water pipes constructed of any suitable material, gas pipes constructed of any suitable material, PVC pipes, CPVC pipes and any other pipe that may require support.

In another embodiment of the present disclosure, a second pipe 300 is arranged in and on second cradle 100 and second ledge 110 of each multi-pipe trapeze hanger 20 mounted on their respective mounting rods 170. Second pipe 300 may be wrapped with, for example, insulation 310, but, it should be understood, that second pipe 300 may be arranged in and on second cradle 100 and second ledge 110 with or without insulation.

Second pipe 300 may be secured in place on second cradle 100 and second ledge 110 with a second securing device 320. Second securing device 320 is wrapped over second pipe 300 and projected through the second at least one opening 152, 154 such that a portion of the second securing device 320 spans the bottom surface 64 of second member 60 thereby securing the second pipe 300 on second member 60. Second securing device 320 may include but is not limited to zip-ties, wire ties, wire and the like.

Note, if second pipe 300 includes an insulating wrap 310, then second securing device 320 will wrap over insulation 310 and through the second at least one opening 152, 154 in the same manner as discussed above. Second pipe 300 may be any type of pipe suitable for being supported. Types of pipes include by are not limited to water pipes constructed of any suitable material, gas pipes constructed of any suitable material, PVC pipes, CPVC pipes and any other pipe that may require support.

Referring to FIG. 3, the multi-pipe suspension system 10 is also suitable for supporting a third pipe 330. Pipe strap 230 is arranged and constructed to support third pipe 330. Third pipe 330 can be any type of pipe, including, but not limited to water pipes constructed of any suitable material, gas pipes constructed of any suitable material, PVC pipes, CPVC pipes and any other pipe that may require support. Preferably, third pipe 330 includes but is not limited to a vent pipe.

The position of each multi-pipe trapeze hanger 10, in a series of mounted hangers can be adjusted on their respective mounting rods 170, as needed for any installation. Typically, the multi-pipe trapeze hangers 10 will be positioned on their respective mounting rods 170 such that the first pipe 270 and second pipe 300 will run relatively horizontally and substantially parallel to the structure (e.g., I-beam 400) from which the multi-pipe suspension system 10 is suspended. However, if it is desirable, the respective multi-pipe trapeze hangers 10 can be individually adjusted on their respective mounting rods such that the pipes can slope upward or downward relative to the structure (e.g., I-beam 400) from which the multi-pipe suspension system 10 is suspended.

Even though FIG. 3 shows three multi-pipe suspension systems 10, the scope of this disclosure includes any number of multi-pipe suspension systems as needed for any specific application. Thus, any specific application may need anywhere from one multi-pipe suspension system to hundreds of multi-pipe suspension systems.

As discussed above, the orientation of the pipes supported on the multi-pipe trapeze hangers 10 may be horizontal or slopped. Similarly, the third pipe 330 supported by pipe strap 230 of the various multi-pipe suspension systems 10 can be either horizontal relative to the other pipes and/or support structure or sloping by adjusting the positions of the couplers 240/pipe straps 230 on their respective mounting rods 170. Referring to FIG. 3, a non-limiting example includes adjusting the position of each of the couplers 240 on the series of mounting rods 170 such that the pipe straps 230 support the third pipe 330 to follow the slope of the ground 500 located below the third pipe 330.

In another embodiment of the present disclosure, the length of the mounting rod 170 can be varied such that a series of multi-pipe suspension systems 10 can utilize different length mounting rods, whereby each multi-pipe suspension system 10 in a series has a longer or shorter mounting rod 170. More particularly, by using a series of progressively longer mounting rods 170, a vent pipe 330 mounted in pipe strap 230 can follow a downward slopping ground 500, while the multi-pipe trapeze hangers 20 in the series can be adjusted to keep the first and second pipes 270, 300 parallel with the structure (e.g., I-beam 400) from which the multi-pipe suspension system 10 is suspended.

It should be understood, that relative positional ten is such as, "upper," "lower," "above," "below" and the like, are with reference to the normal operational position of the device disclosed herein with respect to its normal intended use in supporting pipes in residential and commercial settings. Such positional terms should not be considered otherwise limiting.

The present invention has been described in an illustrative manner. It is to be understood that the terminology that has been employed herein is intended to be in the nature of words of description rather than word of limitation. While there have been described herein what are considered to be exemplary embodiments of the present invention, other modifications of the invention shall be apparent to those skilled in the art from the teachings herein and, it is, therefore, desired to be secured in the appended claims all such modification as fall within the true spirit and scope of the invention.

I claim:

1. An improved multi-pipe trapeze hanger, comprising:
a first member having a first end, an opposing second end, a top edge and opposing bottom, the top edge and bottom extending between the first end and the second end;
a second member contiguous with the first member and extending substantially perpendicular from the bottom of the first member, the second member having at least one first opening located toward the first end and at least one second opening located toward the second end;
a first cradle defined in the first member and configured to receive a first pipe, the first cradle located toward the first end;
a first ledge contiguous with the first member and spaced apart from the second member, the first ledge projecting perpendicularly from a bottom of the first cradle, the first ledge configured to support the first pipe within the first cradle;
a second cradle defined in the first member and configured to receive a second pipe, the second cradle located toward the second end;
a second ledge contiguous with the first member and spaced apart from the second member, the second ledge projecting perpendicularly from a bottom of the second cradle, the second ledge configured to support the second pipe within the second cradle; and
a securing device for securing the first pipe on the first ledge, the securing device constructed to project through the at least one first opening and wrap over the first pipe.

2. The improved multi-pipe trapeze hanger of claim 1, wherein either the first ledge or second ledge extends over the second member.

3. The improved multi-pipe trapeze hanger of claim 1, wherein the second pipe is secured on the second ledge with a second securing device constructed to wrap over the second pipe and project through the at least one second opening.

4. The improved multi-pipe trapeze hanger of claim 1, further comprising a third ledge extending perpendicularly from the first member, the third ledge arranged along the first member between the first ledge and second ledge, wherein the third ledge is constructed for mounting the improved multi-pipe trapeze hanger on a mounting rod.

5. The improved multi-pipe trapeze hanger of claim 1, wherein the at least one first opening and the at least one second opening each comprises two openings.

6. The improved multi-pipe trapeze hanger of claim 4, wherein the second member further comprises a mounting rod guide feature located directly below the third ledge, the mounting rod guide feature constructed to allow the mounting rod to pass through the second member.

7. An improved multi-pipe trapeze hanger, comprising:
a first member having a first end, an opposing second end, a top edge and opposing bottom, the top edge and bottom extending between the first end and the second end;
a second member contiguous with the first member and extending substantially perpendicular from the bottom of the first member, the second member having at least one first opening located toward the first end and at least one second opening located toward the second end;
a first cradle defined in the first member, the first cradle located toward the first end;
a first ledge contiguous with the first member and spaced apart from the second member, the first ledge projecting perpendicularly from a bottom of the first cradle, the first cradle and first ledge configured to support a first pipe;
a second cradle defined in the first member, the second cradle located toward the second end; and
a second ledge contiguous with the first member and spaced apart from the second member, the second ledge projecting perpendicularly from a bottom of the second cradle, the second ledge substantially co-planar with the first ledge; the second ledge and second cradle configured to support a second pipe.

8. The improved multi-pipe trapeze hanger of claim 7 wherein at least one of the first ledge and second ledge extends over and is parallel with the second member.

9. The improved multi-pipe trapeze hanger of claim 7 further comprising a third ledge extending perpendicularly from the first member, the third ledge arranged between the first ledge and second ledge, the third ledge parallel with the first and second ledges, wherein the third ledge is constructed for mounting the improved multi-pipe trapeze hanger on a mounting rod.

10. The improved multi-pipe trapeze hanger of claim 9 wherein the third ledge includes a third opening for receiving the mounting rod, the second member further includes a mounting rod guide located directly below the third opening, the third opening and mounting rod guide arranged to receive the mounting rod.

11. The improved multi-pipe trapeze hanger of claim 10 further comprising a securing device for securing the first pipe on the first ledge, the securing device constructed to project through the at least one first opening and wrap over the first pipe.

12. The improved multi-pipe trapeze hanger of claim 11, wherein the second pipe is secured on the second ledge with a second securing device constructed to wrap over the second pipe and project through the at least one second opening.

13. The improved multi-pipe trapeze hanger of claim 12, wherein the at least one first opening comprises two openings.

14. The improved multi-pipe trapeze hanger of claim 13, wherein the securing device is constructed to project through the two openings of the at least one first opening.

15. The improved multi-pipe trapeze hanger of claim 14, wherein the at least one second opening comprises a second two openings and the second securing device is constructed to project through the second two openings of the at least one second opening.

16. An improved multi-pipe trapeze hanger, comprising:
a first member having a first end, an opposing second end, a top and opposing bottom, the first member defining a first cradle and a second cradle therein, the first cradle configured to receive a first pipe and the second cradle configured to receive a second pipe;
a second member contiguous with the first member, the second member projecting substantially perpendicular from the bottom of the first member, the second member having a first pair of openings located toward the first end, a second pair of openings located toward the second end and a mounting rod guide arranged between the first pair of openings and second pair of openings;
a first ledge contiguous with the first member and projecting perpendicularly from a bottom of the first cradle and over the second member, the first ledge separate from the second member, the first ledge configured to support the first pipe;
a second ledge contiguous with the first member and projecting perpendicularly from a bottom of the second cradle and over the second member, the second ledge separate from the second member, the second ledge substantially co-planar with the first ledge; the second ledge and second cradle configured to support the second pipe;
a third ledge extending perpendicularly from the first member over the second member, the third ledge arranged between the first ledge and second ledge, the third ledge parallel with the first and second ledges, the third ledge defining a third opening arranged directly above the mounting rod guide;
wherein the mounting rod guide and third opening are arranged and constructed for receiving a mounting rod.

* * * * *